July 8, 1969   F. S. TYRRELL   3,454,450
PLASTIC SEALING APPARATUS USING COMBINED
HEAT AND ULTRA-SONIC ENERGY
Filed Jan. 3, 1966
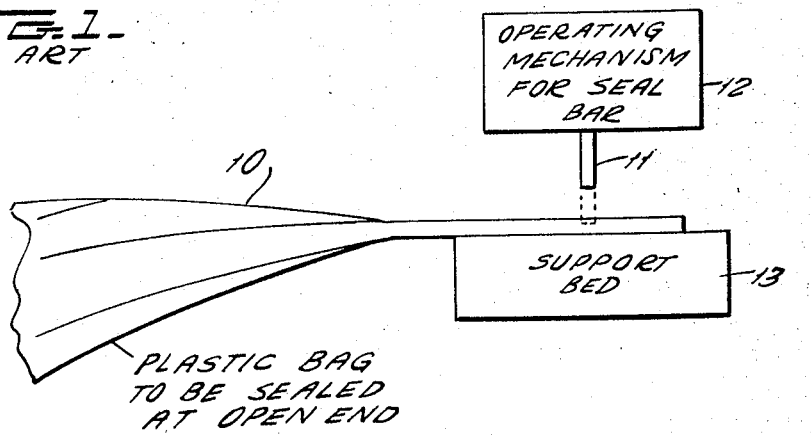
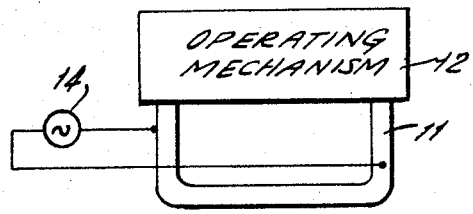
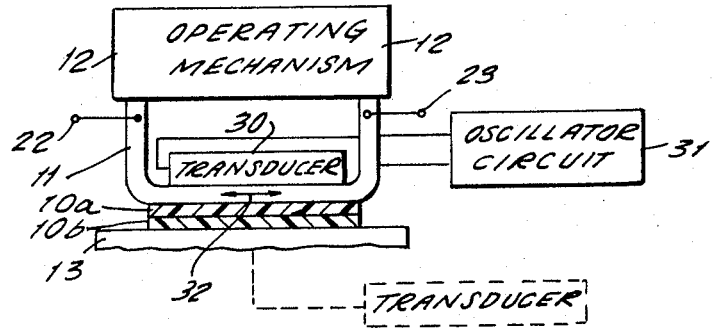
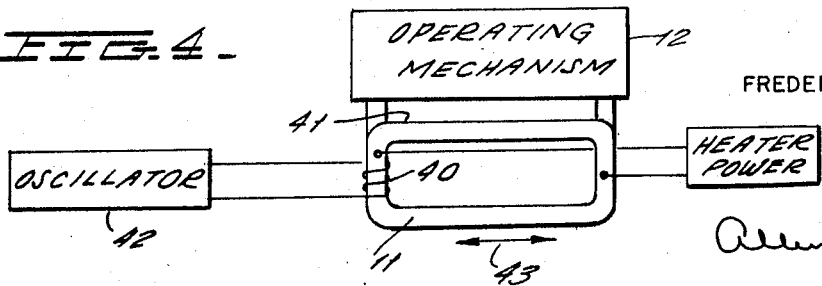
FREDERICK S. TYRRELL
INVENTOR.

United States Patent Office 3,454,450
Patented July 8, 1969

3,454,450
PLASTIC SEALING APPARATUS USING COMBINED HEAT AND ULTRA-SONIC ENERGY
Frederick S. Tyrrell, Fairfield, Conn., assignor to National Distillers and Chemical Corporation, New York, N.Y., a corporation of Virginia
Filed Jan. 3, 1966, Ser. No. 518,101
Int. Cl. B29c 27/06; B29d 9/00
U.S. Cl. 156—499                                    4 Claims

ABSTRACT OF THE DISCLOSURE

Apparatus for heat sealing sheets of plastic material to one another without the exertion of pressure upon said sheets, said apparatus including an electrically heated sealing bar movable from an inoperative position to an operative position in surface contact only with the plastic material, and a source of ultrasonic energy mechanically attached to the sealing bar, the combined heat and ultrasonic energy removing air and contaminants at the interface being sealed, thereby producing an entirely complete seal without any deformation, as by pressure, of the plastic material in the sealed area.

---

This invention relates to sealing apparatus for sealing sheets of plastic to one another along a seal line wherein the sealing bar is both heated and has ultrasonic energy applied thereto for effecting the seal without deforming the plastic region at the seal.

Sealing apparatus for the sealing of plastic sheets to one another, as along a line to define a bag end, are well known to the art. Such sealers commonly employ a heated bar or wire which is laid atop the sheets to be sealed, or two opposing bars or wires are brought against the opposing surfaces of the plastic sheets to be sealed.

When such plastic sealing apparatus is used in sealing bags filled with fluid or powder, or the like, this material has been found to line the seal interface to interfere with the seal. Therefore, in such applications, it has been found that a certain amount of pressure is necessary between the sealing bar and the plastic sheet for the purpose of eliminating air and contaminants from the interfaces of the plastic sheets which are to be sealed. This tends to deform the thickness of the materials being sealed, and frequently will limit the strength of the plastic materials in the seal region.

The principle of the present invention is to direct a source of ultrasonic energy at the plastic members to be sealed. For example, the seal bar can be caused to oscillate at an ultrasonic frequency, with the ultrasonic energy of the seal bar being imparted to the plastic materials to be sealed. It has been found that this action will cause the elimination of air and contaminants between the interface of the materials to be sealed, whereby seal bar pressure is not needed when making the seal, so that no deformation occurs in the seal region.

Accordingly, a primary object of this invention is to improve the seal characteristics of a heat seal formed between two plastic materials.

Another object of this invention is to provide a source of ultrasonic energy for eliminating contaminants between two opposing plastic surfaces which are to be heat sealed to one another.

These and other objects of this invention will become apparent from the following description when taken in connection with the drawings, in which:

FIGURE 1 illustrates a typical prior art sealing apparatus.

FIGURE 1a is a cross-sectional view of the seal effected by the apparatus of FIGURE 1.

FIGURE 2 is a side view of the seal bar of FIGURE 1.

FIGURE 3 illustrates a fisrt embodiment of the invention wherein an ultrasonic transducer is connected to the seal apparatus of FIGURE 2.

FIGURE 4 illustrates a second embodiment of the invention wherein the seal bar is formed of a magnetostrictive material.

FIGURE 5 is a cross-sectional view of the seal obtained with the apparatus of FIGURES 3 and 4 as compared to the seal of FIGURE 1a.

Referring first to FIGURE 1, I have illustrated therein the end portion of a plastic bag 10 wherein the front and rear panels of the bag are to be sealed together. The sealing apparatus then includes a heated seal bar 11 connected to some suitable operating mechanism 12 which can move the seal bar from the solid line position to the dotted line position and into engagement with the plastic panels to be sealed which are laid atop a suitable support bed 13.

The seal bar 11 is then heated in any desired manner, as shown, for example, in FIGURE 2, by forming the seal bar 11 of a relatively high electrical resistance material and connecting a suitable electrical source 14 which passes a heating current through the sealing bar 11.

When using the apparatus of FIGURES 1 and 2 to effect a seal on the front and rear panels 10a and 10b of the bag 10 (FIGURE 1a), it has been found that a certain amount of pressure from the seal bar 11 must be applied to the panels in order to exclude air and contaminants from the region which is to be sealed. For this reason, and when the seal is effected by the flowing of material of panel 10a to panel 10b in the seal region 20 of FIGURE 1a, the plastic material is deformed as by the depression 21 in the upper panel 10a. This produces a weak spot in the package, and can jeopardize the integrity of the seal.

The principle of the present invention is to provide a source of ultrasonic energy in combination with the normally heated seal bar which will act to cause the exclusion of air from the interfaces being sealed without requiring pressure from the seal bar.

One manner in which ultrasonic energy can be applied during the sealing operation is illustrated in FIGURE 3. Referring now to FIGURE 3, the terminals 22 and 23 are connected to a source of heating energy such as source 14 of FIGURE 2 so that the seal bar 11 is heated in the usual manner. In FIGURE 3, however, a transducer 30, which may be of any desired type such as one of the titanate ceramics, which is operable at temperatures higher than the temperature of the seal bar 11, is cemented directly to the seal bar 11 and its electrodes are connected to an oscillator circuit 31.

The oscillator circuit may have an output frequency of from 600 to 40,000 cycles per second with the specific frequency being selected for the particular nature of the film being sealed. The transducer will then impart oscillation to the seal bar in the direction of arrow 32 where this oscillation may also have an additional component perpendicular to the interface being sealed.

It has been found that this will automatically exclude air from the interface which is to be sealed, whereupon it is necessary to bring seal bar 11 only up to the surface of the materials to be sealed, with the heat applied therefrom causing the flow of material from the opposing panels 10a and 10b in the manner shown in FIGURE 5, with the flow region 20 forming the seal in the usual manner. Note, however, that since it was not necessary to apply pressure to the film from the seal bar 11, the film is not deformed adjacent the seal region in FIGURE 5.

As an alternate arrangement for the mounting of the transducer 30 in FIGURE 3, it has also been found possible to connect a suitable transducer directly to the support bed 13, as shown in dotted lines in FIGURE 3.

FIGURE 4 illustrates a further modification for applying the ultrasonic energy to the seal bar 11 where, in FIGURE 4, the seal bar 11 is made of a ferromagnetic material such as any of the transformer steels normally used in the manufacture of transformer cores.

A winding 40 is then placed on the heater 11 which is formed to have a closed magnetic circuit in FIGURE 4 by the addition of magnetic leg 41, and winding 40 is then connected to a suitable oscillator 42. The alternating magnetic field now generated in the seal bar 11 of FIGURE 4 will cause it to expand and contract due to its magnetostrictive characteristics, whereupon the bar 11 will oscillate in the direction of arrows 43 at the frequency of oscillator 42. Note that in FIGURE 4, seal bar heating can be caused directly by the heating of the magnetic material through its normal heating due to the alternating magnetic flux in the magnetic material.

Atlhough this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A sealing device for heat sealing a first and second thermoplastic material along an interface; said sealing device including a heated sealing bar movable into thermal surface contact only with said first and second thermoplastic materials and a source of ultrasonic energy mechanically coupled to said sealing bar; the ultrasonic energy of said source of ultrasonic energy excluding air and contaminants from the interface being sealed; said heated sealing bar engaging one of said first or second thermoplastic materials without distortion pressure to cause the material at said interfcae to flow due to elevated temperature.

2. The sealing device as set forth in claim 1 wherein said first and second thermoplastic materials are elongated film; said seal bar being an elongated member for applying an elongated seal between said elongated first and second films.

3. The device as set forth in claim 1 wherein said source of ultrasonic energy is connected to said seal bar and oscillates said seal bar in a direction perpendicular to the area of said interface.

4. The device as set forth in claim 1 wherein said seal bar is of magnetostrictive material; said source of ultrasonic energy including magnetic field generating means for connecting a varying magnetic field into said seal bar.

References Cited

UNITED STATES PATENTS

| 3,022,814 | 2/1962 | Bodine | 156—73 |
| 3,146,141 | 8/1964 | Woodland | 156—73 |

FOREIGN PATENTS

38/26,578  11/1961  Japan.

DOUGLAS J. DRUMMOND, *Primary Examiner.*

U.S. Cl. X.R.

156—580, 583